US010576533B2

(12) United States Patent
Gaca et al.

(10) Patent No.: US 10,576,533 B2
(45) Date of Patent: Mar. 3, 2020

(54) STAKING TOOL

(71) Applicant: General Electric Company, Schenectady, NY (US)

(72) Inventors: Magdalena Gaca, Warsaw (PL); Adrian Adam Klejc, Warsaw (PL); Mateusz Dolecki, Warsaw (PL)

(73) Assignee: General Electric Company, Schenectady, NY (US)

(*) Notice: Subject to any disclaimer, the term of this patent is extended or adjusted under 35 U.S.C. 154(b) by 146 days.

(21) Appl. No.: 15/895,316

(22) Filed: Feb. 13, 2018

(65) Prior Publication Data

US 2018/0229291 A1 Aug. 16, 2018

(30) Foreign Application Priority Data

Feb. 16, 2017 (EP) .................................... 17461509

(51) Int. Cl.

*B23Q 3/08* (2006.01)
*B21J 15/22* (2006.01)
*F01D 5/30* (2006.01)

(52) U.S. Cl.

CPC ............ *B21J 15/22* (2013.01); *F01D 5/3007* (2013.01); *F01D 5/3053* (2013.01); *F05D 2230/60* (2013.01); *F05D 2230/64* (2013.01); *F05D 2230/70* (2013.01)

(58) Field of Classification Search

CPC ................................. B25B 11/00; B23P 19/00
See application file for complete search history.

(56) References Cited

U.S. PATENT DOCUMENTS

| | | | | | |
|---|---|---|---|---|---|
| 2,485,954 | A | | 10/1949 | Burrell | |
| 2,881,646 | A | | 4/1959 | Farr et al. | |
| 2,944,326 | A | | 7/1960 | Stadthaus et al. | |
| 3,126,776 | A | | 3/1964 | Whistler, Sr. et al. | |
| 3,578,306 | A | * | 5/1971 | Smith | B25B 5/061 269/24 |
| 3,700,227 | A | * | 10/1972 | Sessody | B25B 5/064 269/24 |
| 3,724,837 | A | * | 4/1973 | McPherson | B25B 5/061 269/32 |
| 4,451,026 | A | * | 5/1984 | Coope | B23Q 11/0875 269/24 |
| 5,174,554 | A | * | 12/1992 | Yonezawa | B25B 5/061 269/137 |
| 5,979,886 | A | * | 11/1999 | Craft | B25B 5/064 269/24 |

(Continued)

FOREIGN PATENT DOCUMENTS

| | | | |
|---|---|---|---|
| CN | 101956575 | B | 12/2014 |
| WO | 01/70452 | A1 | 9/2001 |

OTHER PUBLICATIONS

Extended European Search Report and Opinion issued in connection with corresponding EP Application No. 17461509.6 dated Aug. 14, 2017.

*Primary Examiner* — Lee D Wilson
(74) *Attorney, Agent, or Firm* — Eversheds Sutherland (US) LLP

(57) ABSTRACT

A staking tool is disclosed. The staking tool may include a main body, at least one punch disposed within the main body, and an actuator in mechanical communication with the at least one punch. The actuator may be configured to drive the at least one punch from a first position to a second position.

20 Claims, 4 Drawing Sheets

(56) References Cited

U.S. PATENT DOCUMENTS

| | | | | |
|---|---|---|---|---|
| 6,059,277 | A * | 5/2000 | Sawdon | B25B 5/122 269/24 |
| 6,113,086 | A * | 9/2000 | Yonezawa | B25B 5/062 269/24 |
| 6,296,470 | B1 | 10/2001 | Lanser et al. | |
| 7,600,407 | B2 | 10/2009 | Nguyen | |
| 8,485,784 | B2 | 7/2013 | Eastman et al. | |
| 2018/0229291 | A1* | 8/2018 | Gaca | B21J 15/22 |

* cited by examiner

STAKING TOOL

FIELD

The disclosure relates generally to tools and more particularly relates to systems and methods for staking an object.

BACKGROUND

Staking involves the plastic deft), illation of material. In one staking example, a pin and/or the material around the pin may be staked in order to maintain the pin in place. Staking is typically performed manually. For example, a technician may strike a punch with a hammer in order to produce a staking mark. This can result in staking marks that are inconsistent and/or improperly located.

BRIEF DESCRIPTION

According to an embodiment, there is disclosed a staking tool. The staking tool may include a main body, at least one punch disposed within the main body, and an actuator in mechanical communication with the at least one punch. The actuator may be configured to drive the at least one punch from a first position to a second position.

According to another embodiment, there is disclosed a staking tool. The staking tool may include a main body having a cavity and a shaft movably disposed within the cavity. The shaft may include at least one aperture. At least one punch may be disposed within the at least one aperture. The staking tool also may include an actuator in mechanical communication with the shaft. The actuator may be configured to drive the shaft from a first position to a second position.

Further, according to another embodiment, there is disclosed a method for staking an object. The method may include positioning a hydraulic staking tool with at least one punch adjacent to the object. The method also may include actuating the hydraulic staking tool to drive the at least one punch from a first position to a second position.

Other embodiments, aspects, and features of the disclosure will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Figure 1:
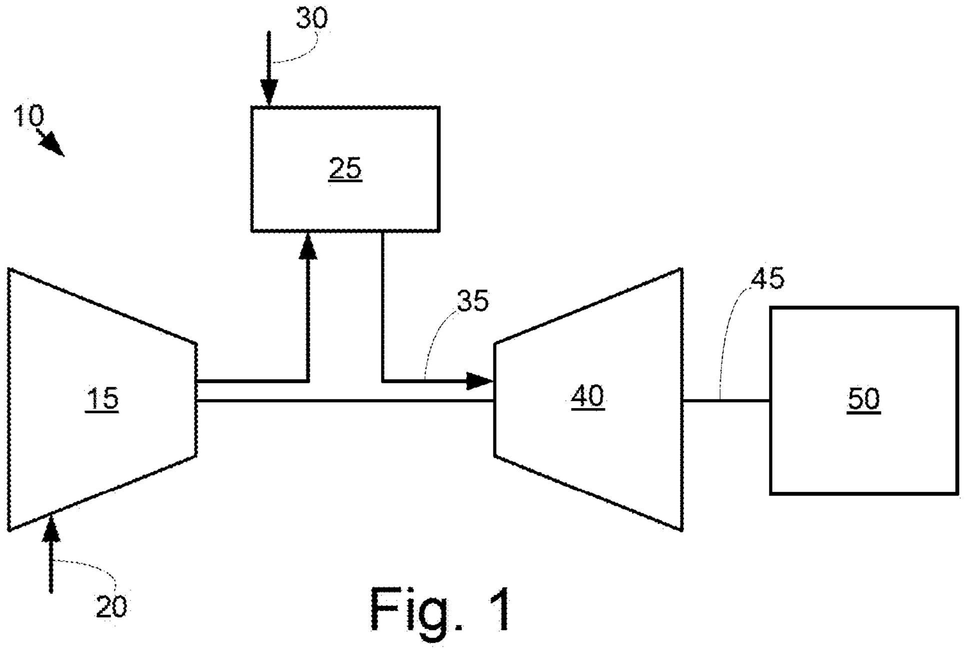
FIG. 1 depicts of an example gas turbine engine according to an embodiment.

Referring now to the drawings, in which like numerals refer to like elements throughout the several views, FIG. 1 depicts a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also May be used herein together.

Figure 2:
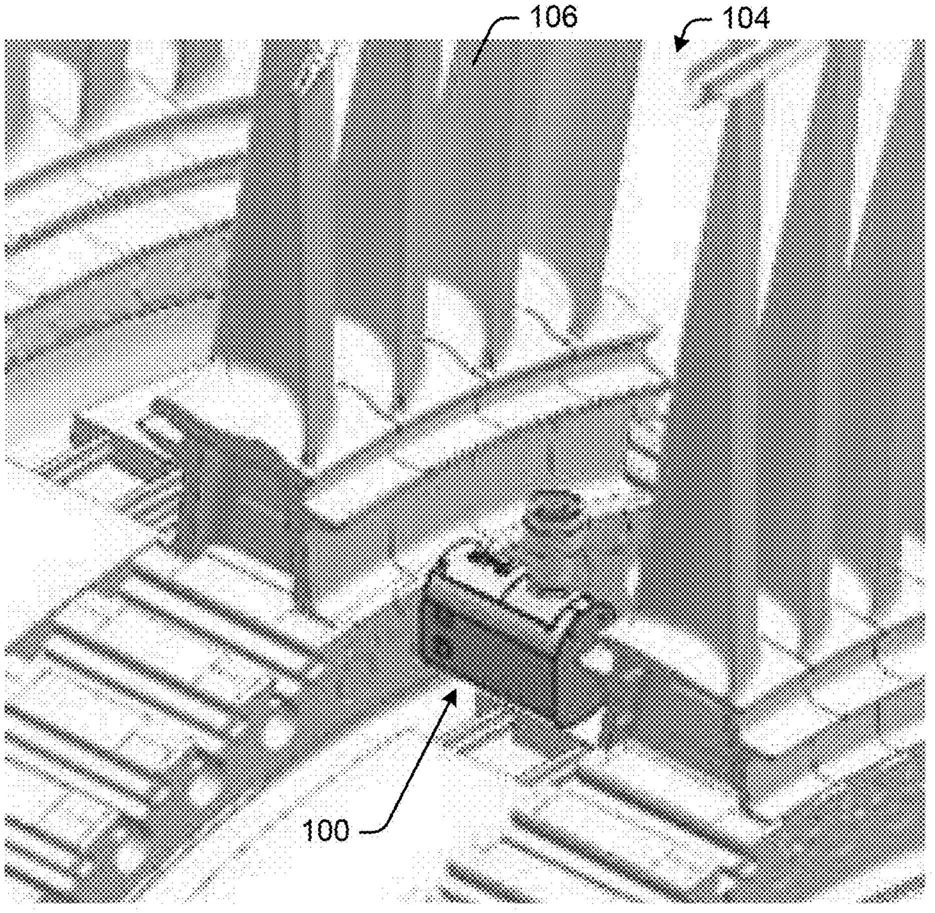
FIG. 2 depicts a staking tool according to an embodiment.

FIG. 2 depicts a staking, tool 100 for staking objects. In some instances, the staking tool 100 may stake pins in a gas turbine engine, such as the gas turbine engine 10 in FIG. 1. Although described in relation to staking pins in a gas turbine engine, the staking tool 100 may be used to stake any material or object in any setting or environment. That is, the staking tool 100 may be used to stake any adjacent or overlapping materials or objects.

Figure 4:
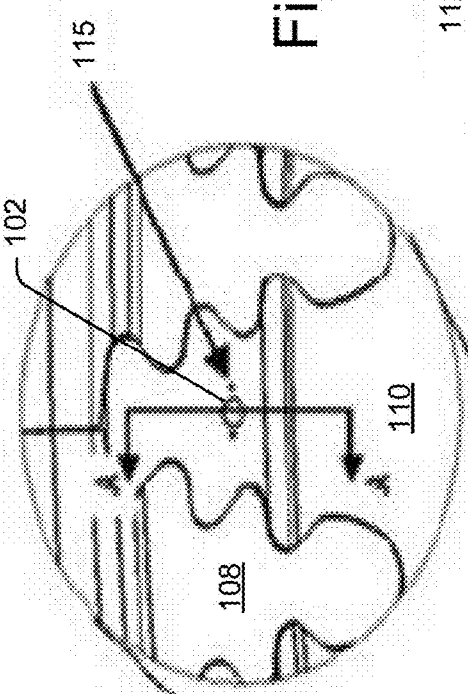
FIG. 4 depicts pins and locking wires for restricting axial movement of blades in a turbine according to an embodiment.
Figure 5:
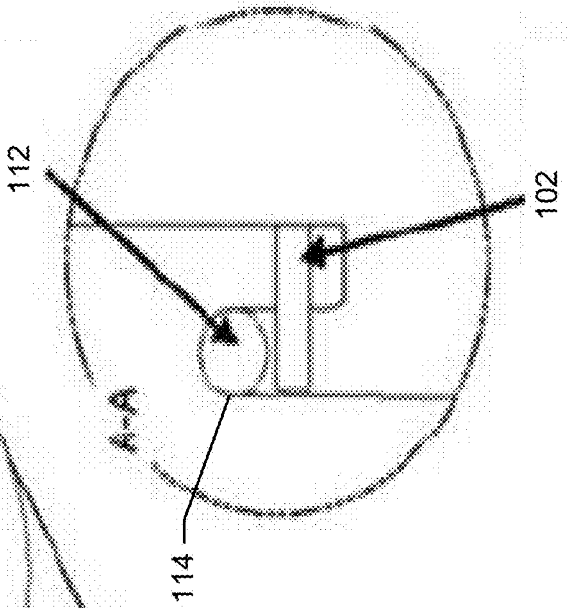
FIG. 5 depicts pins and locking wires for restricting axial movement of blades in a turbine according to an embodiment.
Figure 3:
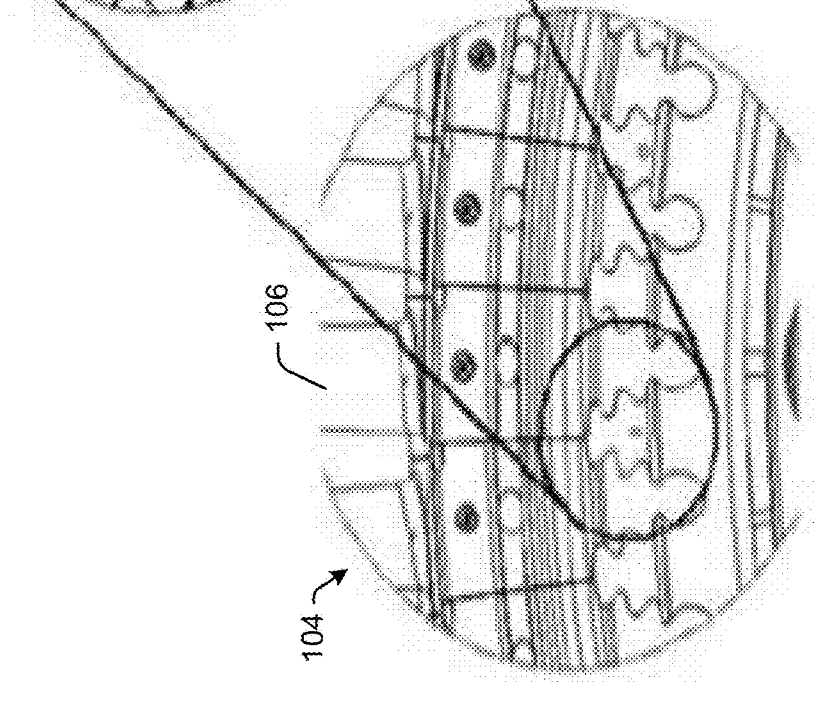
FIG. 3 depicts pins and locking wires for restricting axial movement of blades in a turbine according to an embodiment.

In one example embodiment, the staking tool 100 may be used to stake pins in a compressor or turbine in order to maintain the position of the blades therein. In other instances, the staking tool 100 may be used to stake one or more inlet guide vanes. FIGS. 2-5 depict the staking tool 100 being used to stake pins 102 in a turbine 104 in order to maintain the axial position of the blades 106. For example, the blades 106 may include dovetails 108 that are attached to a rotor 110. The axial movement of the dovetails 108 may be limited by a locking wire 112. The locking wire 112 may be maintained in a channel 114 via the pins 102. As depicted in FIG. 4, the pins 102 may be staked 115 on either side thereof to prevent movement of the pins 102, which in turn prevents movement of the locking wire 112.

Figure 6:
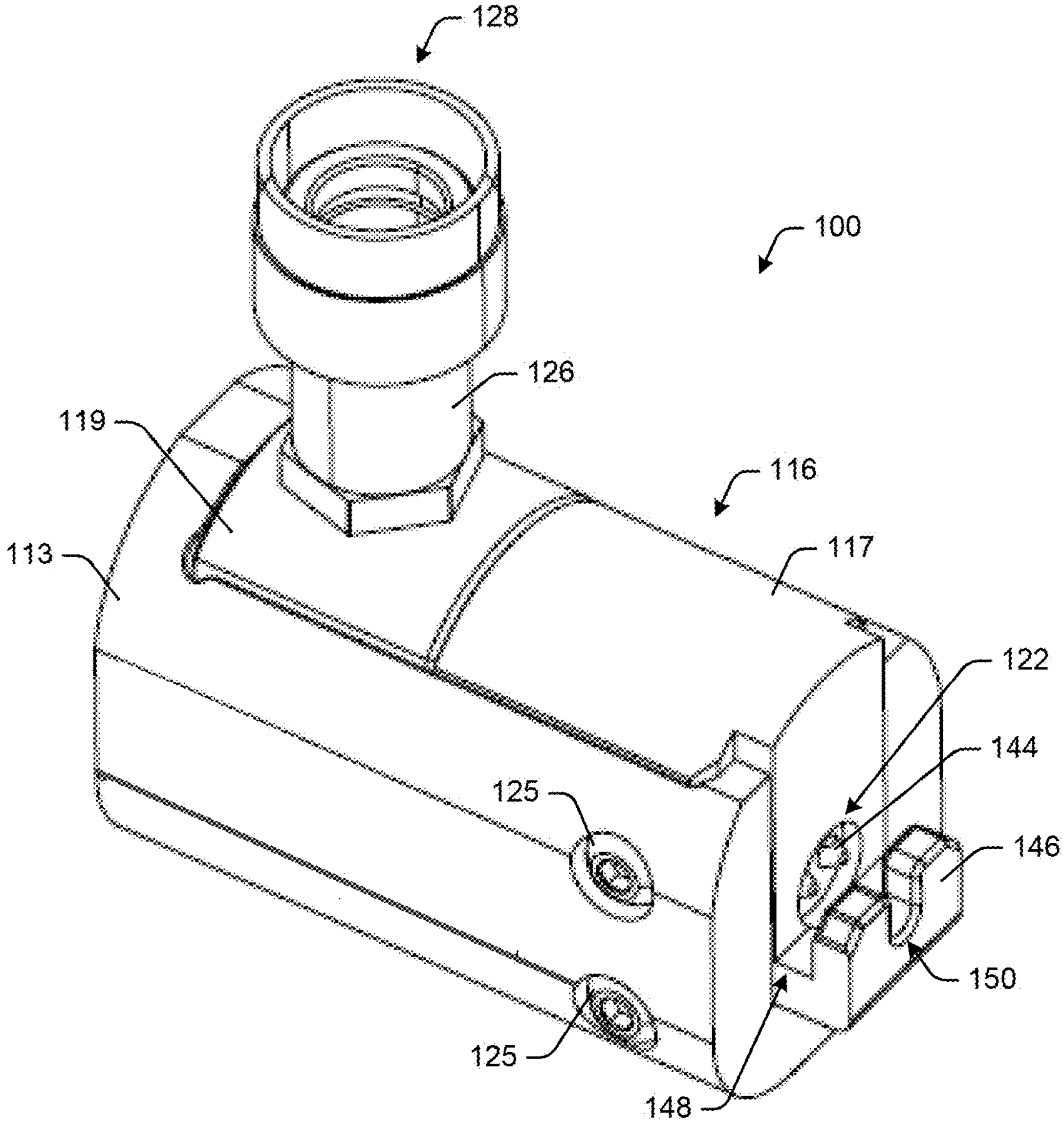
FIG. 6 depicts a staking tool according to an embodiment.
Figure 7:
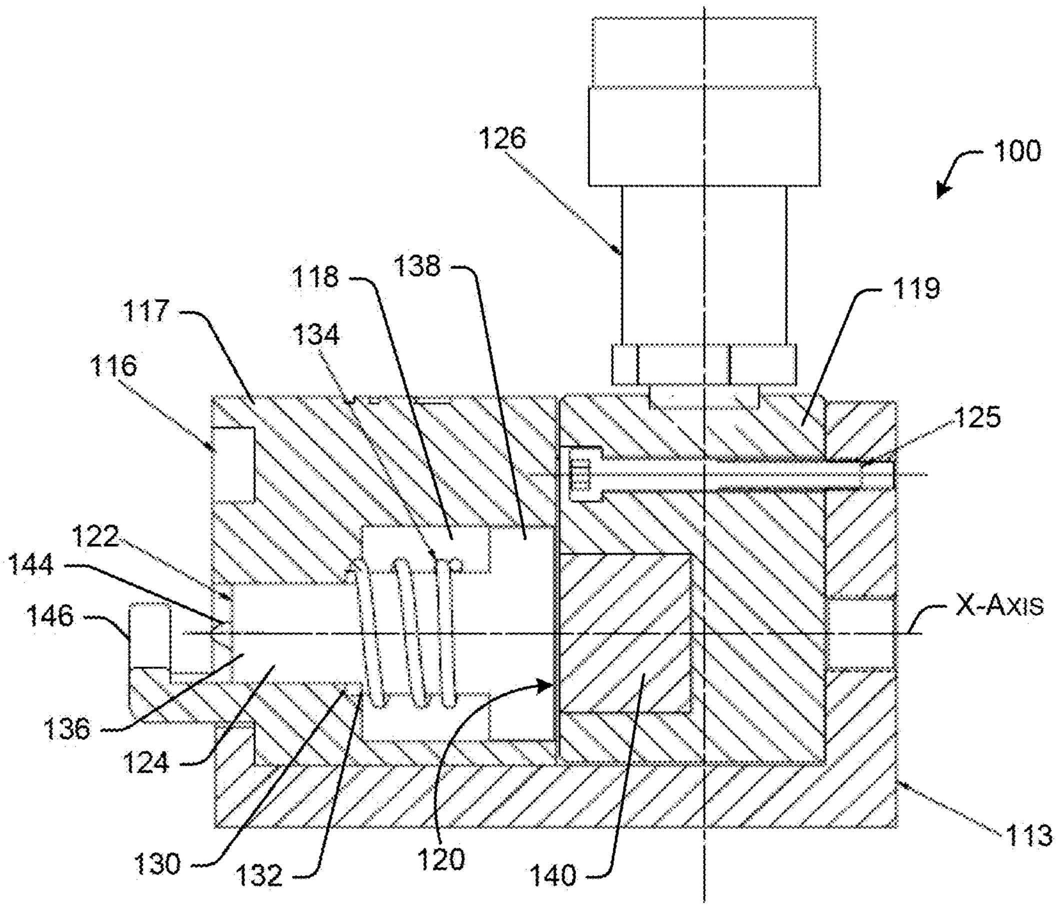
FIG. 7 depicts a cross-section of a staking tool according to an embodiment.

FIGS. 6 and 7 depict the staking tool 100. The staking tool 100 may include a main body 116. In some instances, the main body 116 may form an outer casing of the staking tool 100. The main body 116 may be any size, shape, or configuration. The main body 116 may be a single component or formed by a number of interconnected frames or blocks. For example, the main body 116 may include a first frame 113, a second frame 117, and a third frame 119. The first frame 113, the second frame 117, and the third frame 119 may be interconnected. In some instances, the second frame 117 may house at least some of the punch components, and the third frame 119 may house at least some of the actuator components. In some instances, the main body 116 may include one or more fasteners 125 for connecting the various components of the staking tool 100. Any number of fasteners 125 may be used herein. The fasteners 125 may be any size, shape, or configuration.

The main body 116 may include a cavity 118 therein. The cavity 118 may include a closed end 120 and an opening 122 opposite the closed end 120. The cavity 118 may be any size, shape, or configuration.

A shaft 124 may be movably disposed within the cavity 118. For example, the shaft 124 may move along the X-axis as depicted in FIG. 7. The shaft 124 may be moved by an actuator 126. That is, the actuator 126 may be in mechanical communication with the shaft 124 to drive the shaft 124 from a first position to a second position along the X-axis. In some instances, the actuator 126 may be a hydraulic cylinder or the like. In such instances, the actuator 126 may include a coupling 128 for attaching the actuator 126 in fluid communication with an air compressor or the like. The actuator 126 may be any size, shape, or configuration. In other instances, the actuator 126 may be an electric or gas powered motor. Any type of actuator 126 may be used herein.

The cavity 118 may include a step 130 (or ledge) configured to limit movement of the shaft 124 in the X-axis. For example, the shaft 124 may include a lip 132 configured to engage the step 130 to limit movement of the shaft 124 in the X-axis. A spring 134 may be disposed about the shaft 124 within the cavity 118. The spring 134 may be configured to bias the shaft 124 in the first position. The actuator 126 may push against the shaft 124 to overcome the spring 134 and move the shaft 124 along the X-axis to the second position. In some instances, a first end 136 of the shaft 124 may be offset within the opening 122 when in the first position. A second end 138 of the shaft 124 may abut the closed end 120 of the cavity 118 when in the first position. A block 140 in pneumatic communication with the actuator 126 may push the second end 138 of the shaft 124 to move the shaft 124 to the second position. For example, the actuator 126 may cause a pressure (hydraulic pressure) within the main body 116 to push against the block 140.

Figure 8:
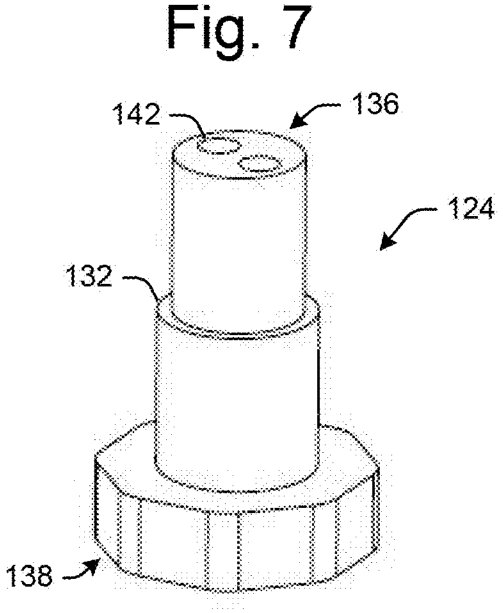
FIG. 8 depicts a shaft of a staking tool according to an embodiment.

As depicted in FIG. 8, the shaft 124 may include at least one aperture 142. In some instances, the shaft may include two apertures 142 that are spaced apart. Referring back to FIGS. 6 and 7, a punch 144 may be disposed within the aperture 142. The tip of the punch 144 may be configured to make a staking mark via plastic deformation. In some instances, the punch 144 may be removable from the aperture 142. In this manner, various punches 144 may be swapped out or replaced to accommodate various staking requirements. For example, the punches 144 may include different harnesses, lengths, thicknesses, and/or point shapes. In some instances, only a single punch 144 may be disposed in one of the apertures 142. In other instances, each of the apertures 142 may include a punch 144. In such instances, the two punches 144 may stake diametrically opposed sides of a pin 102 at the same time and under the same pressure.

In order to prevent the shaft 124 from rotating within the cavity 118 and to ensure the proper alignment of the punches 144, the second end 138 of the shaft 124 may be shaped to prevent rotation of the shaft 124 within the cavity 118. For example, the second end 138 may include a polygonal shape, such as an octagon or the like. The second end 138 of the shaft 124 may be any size, shape, or configuration.

A protrusion 146 may extend from the main body 116 about the opening 122. In some instances, the protrusion 146 may be L-shaped. The protrusion 146 may act as a hook for providing leverage when operating the staking tool 100. That is, the protrusion 146 may form a slot 148 that can be hooked onto a surface to provide a counter force in the opposite direction of the punches 144 as the punches 144 push against the surface. In some instances, the protrusion 146 may include a groove 150. The groove 150 may be configured to slide over a pin 102.

In one example embodiment, while the shaft 124 is in the first position, the slot 148 of the protrusion 146 may be placed within the channel 114 of the locking wire 112, and the groove 150 in the protrusion 146 may be positioned around the pin 102. When in the first position, the punches 144 may be disposed within the opening 122 in the cavity 118. The actuator 126 may then be actuated to move the shaft 124 from the first position to the second position, which may push the punches 144 through the opening 122. The punches 144 may press against the surface of the rotor 110 adjacent to the pin 102 and/or the pins 102 to deform the surface and/or the pins 102 and stake the pin 102 in place. Once the actuator 126 is deactivated, the spring 134 may move the shaft 124 back to the first position.

The staking tool may 100 may ensure accuracy, consistency, and repeatability of the staking marks. For example, the stroke (applied force) of the actuator 126 may be controlled and adjusted as needed to modify the depth and shape of the staking mark. In addition, the punch 144 may be removed and replaced in the aperture 142 to modify the depth and shape of the staking mark. More so, the protrusion 146 may ensure the proper location of the staking marks.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof. Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A staking tool for deforming a pin, comprising:
a main body;
at least one punch disposed within the main body;
an actuator in pneumatic communication with the at least one punch, wherein the actuator is configured to drive the at least one punch from a first position to a second position; and
a protrusion extending from the main body;
the protrusion configured to accommodate the pin when being deformed by the at least one punch.

2. The tool of claim 1, further comprising a shaft movably disposed within the main body.

3. The tool of claim 2, wherein the at least one punch is disposed within at least one aperture.

4. The tool of claim 3, wherein the at least one punch is replaceable within the at least one aperture.

5. The tool of claim 2, wherein the shaft is disposed within a cavity in the main body.

6. The tool of claim 5, wherein the cavity comprises an opening.

7. The tool of claim 5, wherein the cavity comprises a step configured to limit movement of the shaft.

8. The tool of claim 7, wherein the shaft comprises a lip configured to engage the step to limit movement of the shaft.

9. The tool of claim 5, further comprising a spring disposed about the shaft within the cavity, wherein the spring is configured to bias the shaft in the first position.

10. The tool of claim 5, wherein an end of the shaft is shaped to prevent rotation of the shaft within the cavity.

11. The tool of claim 1, wherein actuator comprises a hydraulic cylinder.

12. A staking tool for deforming a pin, comprising:

a main body comprising a cavity;

a shaft movably disposed within the cavity, wherein the shaft comprises at least one aperture;

at least one punch disposed within the at least one aperture;

an actuator in pneumatic communication with the shaft, wherein the actuator is configured to drive the shaft from a first position to a second position; and a protrusion extending from the main body;

the protrusion configured to accommodate the pin when being deformed by the at least one punch.

13. The tool of claim 12, wherein the at least one punch is replaceable within the at least one aperture.

14. The tool of claim 12, wherein the cavity comprises an opening.

15. The tool of claim 14, wherein the at least one punch extends through the opening when the shaft is in the second position.

16. The tool of claim 12, wherein the cavity comprises a step configured to limit movement of the shaft.

17. The tool of claim 16, wherein the shaft comprises a lip configured to engage the step to limit movement of the shaft.

18. The tool of claim 12, further comprising a spring disposed about the shaft within the cavity, wherein the spring is configured to bias the shaft in the first position.

19. The tool of claim 12, wherein an end of the shaft is shaped to prevent rotation of the shaft within the cavity.

20. The tool of claim 1, wherein the protrusion comprises an L-shaped protrusion, the L-shaped protrusion leveraging the tool to provide a counter force as the at least one punch moves between the first position and the second position.

* * * * *